United States Patent [19]

Staerzl

[11] 4,320,335
[45] Mar. 16, 1982

[54] ENERGY REGULATING SYSTEM
[75] Inventor: Richard E. Staerzl, Fond du Lac, Wis.
[73] Assignee: Brunswick Corporation, Skokie, Ill.
[21] Appl. No.: 59,054
[22] Filed: Jul. 19, 1979
[51] Int. Cl.³ ............................................... H02J 7/10
[52] U.S. Cl. ........................................ 320/59; 320/71; 320/DIG. 2; 322/89
[58] Field of Search ............... 320/57, 59, 71; 322/89, 322/90, 91; 323/22.5 CR

[56] References Cited
U.S. PATENT DOCUMENTS

| | | | |
|---|---|---|---|
| 3,341,763 | 9/1967 | Noddin | 322/91 |
| 3,571,657 | 3/1971 | Domann | 322/28 X |
| 3,601,685 | 8/1971 | Kuhn | 322/91 X |
| 3,602,796 | 8/1971 | Bleher | 322/28 |
| 3,757,199 | 9/1973 | Minks | 322/91 X |

Primary Examiner—Robert J. Hickey
Attorney, Agent, or Firm—Andrus, Sceales, Starke & Sawall

[57] ABSTRACT

An energy regulating system includes a D.C. battery electrically connected to a single phase winding of an A.C. generator through a full wave rectifying circuit. An SCR switch is directly connected in parallel to a Zener diode forming one bridge leg to selectively short circuit such Zener diode when the battery voltage exceeds a predetermined level. An integrated circuit includes a voltage comparator providing an independent, substantially constant reference signal which is compared to battery potential to provide a temperature independent gating output to the control SCR. The integrated circuit provides current limiting to maintain the gating signal within a predetermined magnitude.

2 Claims, 1 Drawing Figure

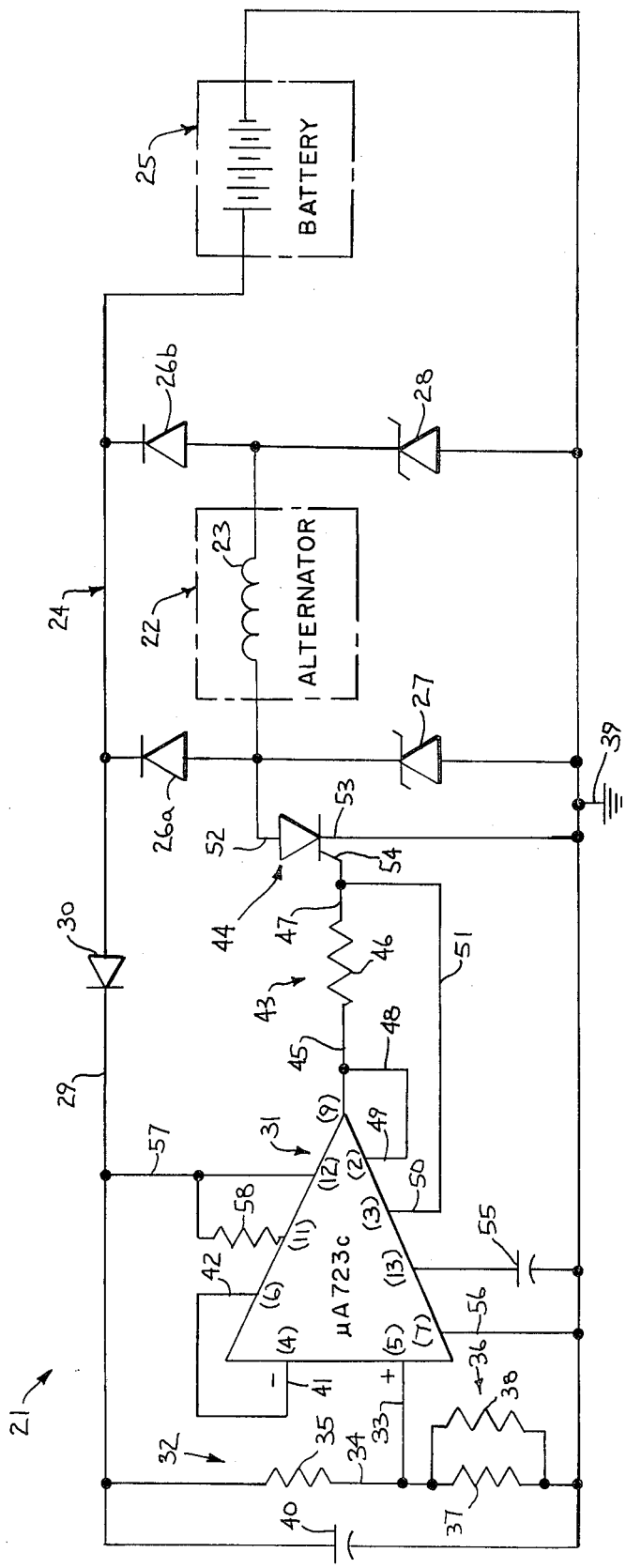

ENERGY REGULATING SYSTEM

BACKGROUND OF THE INVENTION

This invention relates to an energy regulating system.

Conventional battery charging systems have employed a full wave bridge rectifier for connecting a single phase alternator winding to a battery thereby converting A.C. energy to D.C. energy to charge the battery. Where an alternator continuously operates for a substantial period of time, overcharging of the battery may occur which, in some instances, may destroy the battery due to an excessive current condition.

Some systems have sensed the battery voltage to selectively operate an SCR switch to connect a compensating winding of the generator in circuit with the energy generating winding. The SCR gating current in such system is obtained directly from the battery through a series circuit including a resistor and a Zener diode. The temperature instability of the SCR and Zener diode results in poor voltage regulation.

SUMMARY OF THE INVENTION

The energy regulating system includes a battery electrically connected to an electrical energy generating winding of a generator through a connecting circuit. A switch is connected to the connecting circuit for operation between a first condition to supply electrical energy from the winding to the battery and a second condition to operatively interrupt the flow of electrical energy from the winding to the battery. A control responds to the charge level of the battery to provide a temperature independent, current limited output to operate the switch to transfer from the first condition to the second condition to interrupt the energy flow to the battery when the charge signal exceeds the predetermined magnitude.

DESCRIPTION OF THE DRAWING

The FIGURE is a circuit schematic including block diagrams illustrating an energy regulator.

DESCRIPTION OF THE PREFERRED EMBODIMENT

An energy regulating system 21 provides a single phase alternator 22 including an electrical generating winding 23. A connecting circuit 24 electrically joins the winding 23 to a battery 25. The connecting circuit 24 includes a full wave bridge circuit including a pair of diodes 26a and 26b and a pair of Zener diodes 27 and 28. The cathodes of diodes 26a and 26b are mutually connected to the positive terminal of battery 25 and the anodes of diodes 26a and 26b are connected to the winding 23. The anodes of Zener diodes 27 and 28 are connected to the negative terminal of battery 25 and the cathodes of Zener diodes 27 and 28 are connected to the winding 23.

A voltage sensing circuit 29 includes a diode 30 electrically connected to the positive terminal of battery 25 for reverse battery protection. An integrated circuit 31 is connected to the voltage sensing circuit 29 through a voltage divider circuit 32. The integrated circuit 31 operates as a comparator and may be purchased from any one of a number of manufacturing sources, such as Texas Instruments, for example, under the designation uA723C. An non-inverting input 33 of the integrated circuit 31 is connected to the voltage divider 32 and particularly to a connecting circuit 34 joining a resistor 35 and a resistance network circuit 36 comprising parallel connected resistors 37 and 38. The resistance network 36 is connected to the system neutral or ground circuit 39. A stabilizing capacitor 40 is parallel connected to the voltage divider 32 and operates to short circuit high frequency transients which may be received through the voltage sensing lead 29.

An inverting input 41 of the integrated circuit 31 is connected to a $V_{ref}$ terminal 42 provided by the integrated circuit 31. In such manner, a highly regulated reference signal $V_{ref}$ is maintained at the inverting input 41 which is at a substantially constant magnitude and independent of temperature variations and of variations in battery potential. An output circuit 43 interconnects the integrated circuit 31 to a switch 44 and includes a connecting circuit 45, a current sensing resistor 46 and a connecting circuit 47. A feedback circuit 48 is connected to circuit 45 to provide feedback to a current limiting input 49 of the integrated circuit 31. The connecting circuit 47 is connected to a current sense terminal 50 of the integrated circuit 31 through a connecting circuit 51.

The switch 44 is directly parallel connected to the Zener diode 27 and consists of a semiconductor controlled rectifier (SCR) having an anode circuit 52 connected to the cathode circuit of the Zener diode 27. A cathode circuit 53 of SCR 44 is connected to the system neutral or ground circuit 39 while a gate circuit 54 is connected to the integrated circuit 31 through connecting circuits 45 and 47 and the current sensing resistor 46.

A compensating capacitor 55 is connected to the compensation terminal of integrated circuit 31 while the V— terminal is connected to the system neutral or ground 39 through a circuit 56. The V+ and $V_c$ terminals of integrated circuit 31 are connected to a voltage reference lead 29 through a connecting circuit 57 including resistor 58. The resistor 58 provides voltage protection for the integrated circuit 31.

In operation, alternator 22 functions to supply full wave rectified energizing power to charge the battery 25 through the connecting circuit 24. The potential of battery 25 is sensed through sensing circuit 29 which is monitored at the non-inverting input 33 of the integrated circuit 31. When the potential at input 33 increases to a predetermined level, such as seven volts D.C., for example, as established by the reference potential $V_{ref}$ appearing at the inverting input 41, the integrated circuit 31 switches from an OFF to an ON condition to supply an energizing signal through the output 43 to the gate circuit 54 of switch 44. The appearance of a predetermined signal at input 33 signifies that battery 25 has been charged to a predetermined level, such as 14.2 volts D.C., for example, and that additional charging could result in battery 25 receiving excessive current which might otherwise damage or destroy battery 25.

When integrated circuit 31 turns ON and provides an energizing signal to gate 54, the SCR 44 turns ON to provide a short circuit path around the Zener diode 27. In such manner, energy from winding 23 of alternator 22 is gated through the SCR 44 to the system neutral or ground 39 and is thus diverted away from battery 25. In such manner, an overcharge condition on battery 25 is substantially reduced or eliminated.

The output at connector circuit 45 of output 43 is fed back through circuit 48 to provide a current limit to the energizing signal at output 43 as provided through the integrated circuit 31. In such manner, an excessive signal at output 43 operatively functions through the current limit input 49 of the integrated circuit 31 to reduce the amount of current supplied to connecting circuit 43 and maintain the energizing output within a pre-established value for safe operation and the the protection of SCR 44.

The energy regulating system of the present invention provides a regulated D.C. supply from a single phase alternator to substantially reduce the output of the alternator during alternate half-cycles whenever the battery is charged to a predetermined level to prevent overcharging and damage to the battery. The system provides a temperature compensated reference voltage source to provide regulation which is substantially independent of temperature variations and provides independent gating with current limitation for controlling the flow of energy.

I claim:

1. An energy regulating system wherein a battery is electrically connected to an electrical energy generating winding of a generator through a connecting circuit with a switch connected to the connecting circuit for operation between a first condition to supply electrical energy from the winding to the battery and a second condition to operatively interrupt the flow of electrical energy from the winding to the battery, wherein the improvement comprises a comparator including a current limit circuit and a reference circuit providing a substantially constant reference signal substantially independent of temperature variations and independent of the charge of said battery, said comparator having a first input connected to said battery through a sensing circuit to continually receive a signal directly proportional to said battery charge and a second input connected to said reference circuit to receive said independent reference signal and providing an output circuit operatively connected to said switch to transfer from the first condition to the second condition to interrupt the energy flow to the battery when the charge indicative signal exceeds a predetermined magnitude established in response to the reference signal, and including a current limiting feed back circuit connected to said output circuit and to said current limit circuit to limit the magnitude of current supplied to said switch.

2. An energy regulating system, comprising a D.C. battery electrically connected to a single phase winding of an A.C. generator through a rectifying circuit, a switch connecting said single phase winding to a system ground, , a comparator comprising an operational amplifier including a reference circuit including a highly regulated and independent control providing a substantially constant reference signal substantially independent of temperature variations and independent of the charge of said battery, said comparator having a first input connected to said battery through a sensing circuit to continually receive a signal directly proportional to said battery charge and a second input connected to said reference circuit to receive said reference signal and providing an output circuit operatively connected to said switch to provide a temperature independent gating signal to transfer said switch from a first condition to a second condition to electrically connect said single phase winding to ground to limit the charge to said battery, said operational amplifier including a current limit circuit, and a current limiting feed back circuit connected to said output circuit and to said current limit circuit to limit the magnitude of current supplied to said switch.

* * * * *